(12) United States Patent
Tian

(10) Patent No.: US 8,654,428 B2
(45) Date of Patent: Feb. 18, 2014

(54) ELECTROWETTING DISPLAY UNIT AND ELECTROWETTING DISPLAY DEVICE

(75) Inventor: Xiaoxiong Tian, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 76 days.

(21) Appl. No.: 13/478,494

(22) Filed: May 23, 2012

(65) Prior Publication Data

US 2012/0300278 A1 Nov. 29, 2012

(30) Foreign Application Priority Data

May 26, 2011 (CN) .......................... 2011 1 0138666

(51) Int. Cl.
*G02B 26/02* (2006.01)
(52) U.S. Cl.
USPC .............................................................. 359/228
(58) Field of Classification Search
USPC ................. 359/227, 228, 296, 245, 253, 665;
345/32, 42, 48, 60, 84, 102, 105, 107,
345/204
See application file for complete search history.

(56) References Cited

U.S. PATENT DOCUMENTS 7,821,699 B1 10/2010 Lo et al.
7,847,996 B2 * 12/2010 Chen et al. ................. 359/228
2006/0132927 A1 6/2006 Yoon
2008/0150867 A1 6/2008 Miyata et al.
2009/0027317 A1 1/2009 Cheng et al.
2011/0084944 A1 4/2011 Bae
2013/0010348 A1 1/2013 Massard et al.

FOREIGN PATENT DOCUMENTS

CN 101355836 A 1/2009
CN 102792207 A 11/2012

OTHER PUBLICATIONS

First Chinese Office Action dated Jun. 18, 2013; Appln. No. 201110138666.X.

* cited by examiner

*Primary Examiner* — Euncha Cherry
(74) *Attorney, Agent, or Firm* — Ladas & Parry LLP

(57) ABSTRACT

The disclosed technology provides an electrowetting display unit and an electrowetting display device. The electrowetting display unit comprises a polar fluid, a non-polar fluid that is colored, and separation walls for surrounding the polar fluid and the non-polar fluid; a medium layer located below the fluid chamber and in contact with the non-polar fluid or polar fluid in the fluid chamber; and an electrode located below the medium layer. Spaces are provided on the separation walls, have openings toward the medium layer, and function to completely or partially store the non-polar fluid when a voltage is applied between the polar fluid and the electrode. The electrowetting display device comprises the electrowetting display unit.

11 Claims, 6 Drawing Sheets

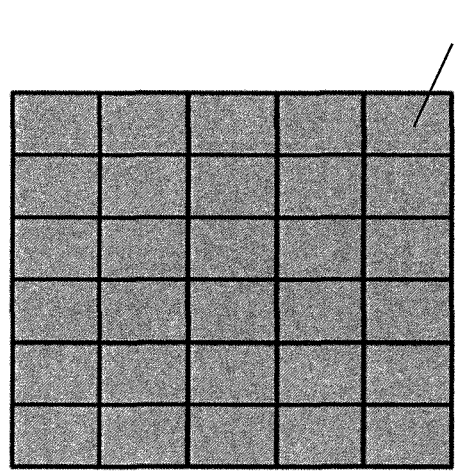 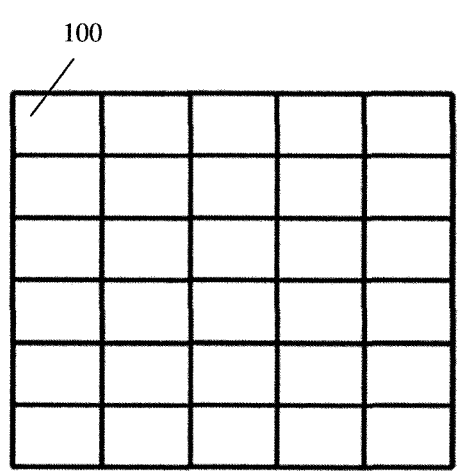
Fig.6a                    Fig.6b

ELECTROWETTING DISPLAY UNIT AND ELECTROWETTING DISPLAY DEVICE

BACKGROUND

Embodiments of the disclosed technology refer to an electrowetting display (EWD) unit and an electrowetting display device.

The electrowetting display technology is a type of display technology that was introduced in recent years. The electrowetting display technology has the advantages such as bistable displaying, excellent reflectivity, low consumption, wide temperature range, and rapid response, and therefore has drawn increasing attention. Although the electrowetting display technology is now developed in its initial stage, but it may become an important display technology in the future due to its good characteristics and the potential for future development.

The electrowetting display technology is such a technology which controls the interface between fluids that is surrounded (or confined) by sidewalls, by applying a voltage, to cause a change of an electrowetting display unit (typically one pixel unit within a display device). FIG. 1a is a schematic cross-sectional view illustrating a conventional electrowetting display unit in a dark state when no voltage is applied. The conventional electrowetting display unit 100 shown in FIG. 1a includes a fluid chamber 10, a medium layer 3, and an electrode 4. The fluid chamber 10 is defined by side walls (not shown), a polar fluid 1 is provided in the upper portion of the fluid chamber 10, and a non-polar fluid 2 is provided in the lower portion of the fluid chamber 10. In the dark state, the non-polar fluid 2 at the lower portion of the fluid chamber is between the polar fluid 1 and the medium layer 3. During operation of the electrowetting display, the layer of the non-polar fluid 2 can have two functions. One of the functions is a blocking function generally used in a black-white mode display, in which the non-polar fluid layer blocks light or colors and typically is in the black color for a user. The other function is a displaying function generally used in a color mode display, in which the non-polar fluid layer is colored. As shown in FIG. 1a, when no voltage is applied, the non-polar fluid 2 is formed in a flat thin film on the medium layer 3, so that one colored pixel point can observed. When a voltage is applied between the electrode 4 and the polar fluid 1 to realize a bright state for displaying, the contact surfaces of the polar fluid 1 and the medium layer 3 are polarized to have an increased surface energy, thus the surface tensile in the contact surfaces are changed. What is resulted is that the medium layer 3 becomes not hydrophobic any more, and the original stationary state of the display unit becomes not stable any more, so the non-polar fluid 2 is moved to a corner of the display unit so as to form one partially transparent pixel point. FIG. 1b is a cross-sectional view of the conventional electrowetting display unit in a bright state.

When different pixels of the display device are individually driven to display images, the non-polar fluids in the pixels are colored to present different kinds of colors and so as to perform colorful displaying. In theory, any color can be accorded to the display pixels so as to obtain desirable display results. When an electrowetting display unit is employed in a black-white mode display, the non-polar fluid is in the black color. FIGS. 2a and 2b are cross-sectional views illustrating a part of electrowetting display device comprising three electrowetting display units 100 (i.e., three pixels) in a dark state and a bright state, respectively. Separation walls 20 for separating two adjacent display units 100 (i.e., two adjacent pixels) are provided as shown in FIGS. 2a and 2b and are also used to surround (confine) the polar fluid 1 and the non-polar fluid 2 in each display unit.

FIGS. 3a and 3b show top views of the display results from the electrowetting display device including a plurality of display units 100 (e.g., a pixel array) in the dark state when a driving voltage is not applied and in the bright state when a driving voltage is applied, respectively. As shown in FIG. 3b, most part of the pixel array of the electrowetting display device shows the bright state for the outside, but one corner in each pixel unit 100 is still in the dark state for the outside.

As described above, although the electrowetting display technology has many advantages, but when a driving voltage is applied between the polar fluid and the non-polar fluid in each pixel unit for displaying in a bright state, as represented by the arrows in FIGS. 1b, 2b, and 3b, the non-polar fluid shrinks but still remains at one corner of the pixel unit, thus a complete uniform displaying cannot be obtained in the bright state. Especially, when the electrowetting display is used in a black-white mode display, a full-white display cannot be realized and the black non-polar fluid can still be observed at the corner of each pixel unit. The visibility of the colored non-polar fluid in pixel units reduces the contrast and transmittance of the display device, so that a good display quality cannot be ensured. That is, in the bright state, the non-polar fluid also occupies some areas of the pixel unit which lowers the display quality.

SUMMARY

An embodiment of the disclosed technology provides an electrowetting display unit, comprising: a fluid chamber comprising a polar fluid, a non-polar fluid that is colored, and separation walls for confining the polar fluid and the non-polar fluid; a medium layer located below the fluid chamber and in contact with the non-polar fluid or polar fluid in the fluid chamber; and an electrode located below the medium layer, wherein spaces are provided on the separation walls, have openings toward the medium layer, and function to completely or partially store the non-polar fluid when a voltage is applied between the polar fluid and the electrode.

Another embodiment of the disclosed technology further provides an electrowetting display device comprising the above described electrowetting display unit.

Further scope of applicability of the disclosed technology will become apparent from the detailed description given hereinafter. However, it should be understood that the detailed description and specific examples, while indicating preferred embodiments of the disclosed technology, are given by way of illustration only, since various changes and modifications within the spirit and scope of the disclosed technology will become apparent to those skilled in the art from the following detailed description.

BRIEF DESCRIPTION OF DRAWINGS

The disclosed technology will become more fully understood from the detailed description given hereinafter and the accompanying drawings which are given by way of illustration only, and thus are not limitative of the disclosed technology and wherein:

FIGS. 6a and 6b are top views illustrating an electrowetting display device comprising an electrowetting display unit according to the disclosed technology when a voltage is applied and a voltage is not applied, respectively.

DETAILED DESCRIPTION

Figure 1A:
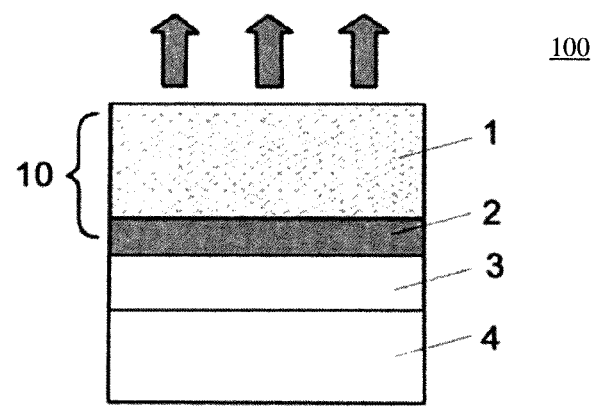
FIGS. 1a and 1b are cross-sectional views illustrating a conventional electrowetting display unit in a dark state and a bright state, respectively.

In order to make the embodiments of the disclosed technology more apparent and easy to be appreciated, the detailed description will be given below in connection with the accompany drawings.

It should be understood that the drawings are not drawn in actual scales. The drawings are used for only illustrating the embodiments of the disclosed technology, but not in a limitative way. Also, same or corresponding elements are indicated by same or corresponding reference numbers in the drawings.

Figure 1B:
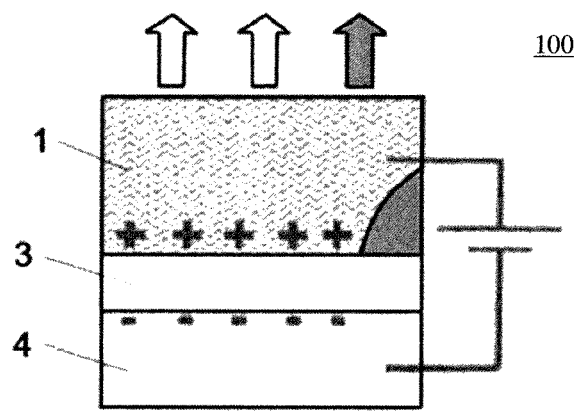

FIG. 1a schematically shows a cross-sectional view of a conventional electrowetting display unit. In FIG. 1a, a medium layer 3 is provided between a fluid chamber 10 and an electrode 4, and the contact surface of the medium layer 3 with the non-polar fluid 2 is flat. When a voltage is applied to the electrowetting unit shown in FIG. 1a so as to make the contact surface of the medium layer 3 more hydrophilic (wettable), and the state of the non-polar fluid 2 is changed under the effect of the surface tension, because the original hydrophobic surface of the medium layer 3 is now changed to a hydrophilic surface under the applied voltage. That is, the non-polar fluid 2 shrinks or retreat from a flat thin film and is moved to one corner of the display unit, as shown in FIG. 1b. As arrows in FIGS. 1a and 1b indicated, three arrows in FIG. 1a are black to indicate the display unit in a dark state, while two of three arrows are white and the rest one of the three arrows is black in FIG. 1b to indicate that although the display unit is intended to be in a bright state, but the display unit can not display full-white color in the black-white mode display due to the non-polar fluid 2 remaining at the corner of the display unit. In this way, the display quality of the display unit is greatly reduced.

In order to overcome the above problems in the conventional technology, one or more embodiments of the disclosed technology bring about modifications and provide a new electrowetting display unit and a new electrowetting display device. In the embodiments of the disclosed technology, when the display device works in a bright state, the non-polar fluid is not attached to a corner or a middle portion of the bottom surface of the fluid chamber and thus does not block the light from passing therethrough, and the non-polar fluid is stored in spaces (e.g., grooves, cavities or the like) provided on or in separation walls of the fluid chamber of a pixel unit, so that the adverse effect on display performance by the non-polar fluid can be reduced. Also, improvement of the transmittance and the display contrast can be achieved. In this end, the disclosed technology modifies the separation walls of the fluid chamber. That is, spaces are provided on the separation walls of the fluid chamber and have openings toward the medium layer, so that when the electrowetting display unit is applied with electric power (voltage), the non-polar fluid is pressed, that is moved, to a periphery of the fluid chamber by the polar fluid due to the change of the surface tension at the interface between the polar fluid and the non polar fluid. At this time, the non-polar fluid is pressed into the spaces of the separation walls by the pressure of the polar fluid to the non-polar fluid, which is controlled by the electrode, rather than attached to the corner or the middle portion of the bottom surface of the fluid chamber to block a part of light. In this way, when the display device works in the bright state, the non-polar fluid is pressed into the spaces formed on the separation walls, thus the visibility of the non-polar fluid (or the possibility that the non-polar fluid can be observed) in some timings (e.g., in full-white display) can be reduced, an adverse impact on the displaying can be reduced, and the transmittance and contrast of the electrowetting display are enhanced accordingly.

Figure 4A:
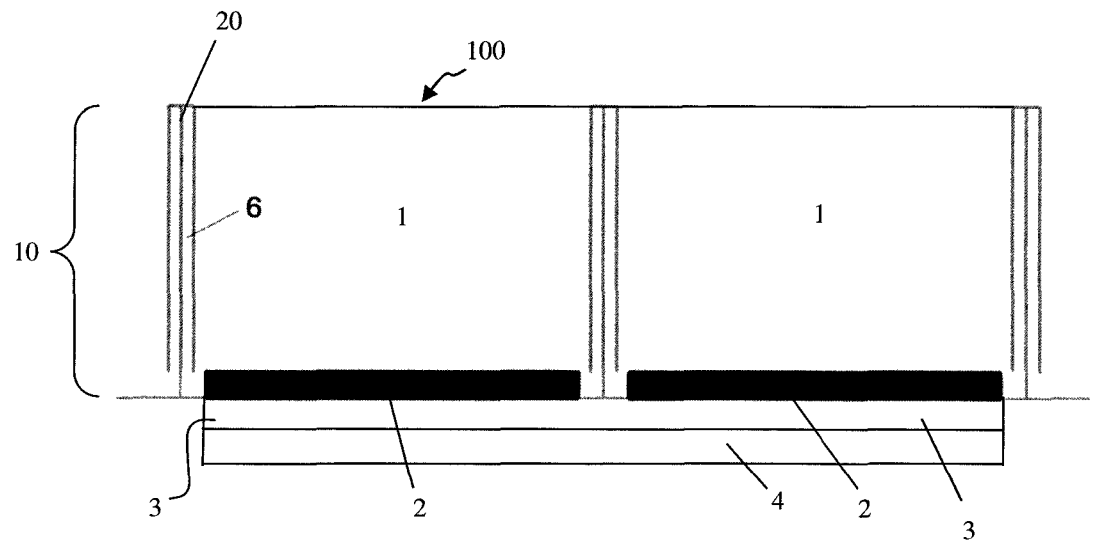
FIGS. 4a and 4b are cross-sectional views schematically illustrating an electrowetting display unit in which spaces are disposed on separation walls, in a dark state and a bright state, respectively, according to a first embodiment of the disclosed technology.

FIG. 4a schematically shows an electrowetting display unit in which spaces are disposed on separation walls of a fluid chamber, in a dark state, according to a first embodiment of the disclosed technology. As shown in FIG. 4a, in a dark state, the non-polar fluid 2 is within the fluid chamber 10 in a flat state, that is, blankets the bottom of the chamber 10; the polar fluid 1 is above the non-polar fluid 2 and does not mix with the non-polar fluid 2 due to the different properties of the polar fluid 1 and the non-polar fluid 2. Unlike the conventional technology, the spaces 6 are provided on the separation walls of the fluid chamber for containing the non-polar fluid 2 therein. In the first embodiment, upper portions of the spaces 6 are closed and the spaces 6 are opened downwardly (i.e., toward the medium layer 3). The examples of the spaces include grooves, cavities, chambers or the like.

When the electrowetting display unit 100 is applied with electric power to realize display in the bright state, the surface tension of the interfaces of the polar fluid 1 and the medium layer 3 is changed, since the property of the medium layer 3 is now changed from hydrophobicity to hydrophilicity. Thus, the original stationary state of the display unit is not stable any more, and the polar fluid 1 presses the non-polar fluid 2 into the corner of the fluid chamber 10, and the polar fluid 1 can be directly in contact with the underlying medium layer 3.

Figure 4B:
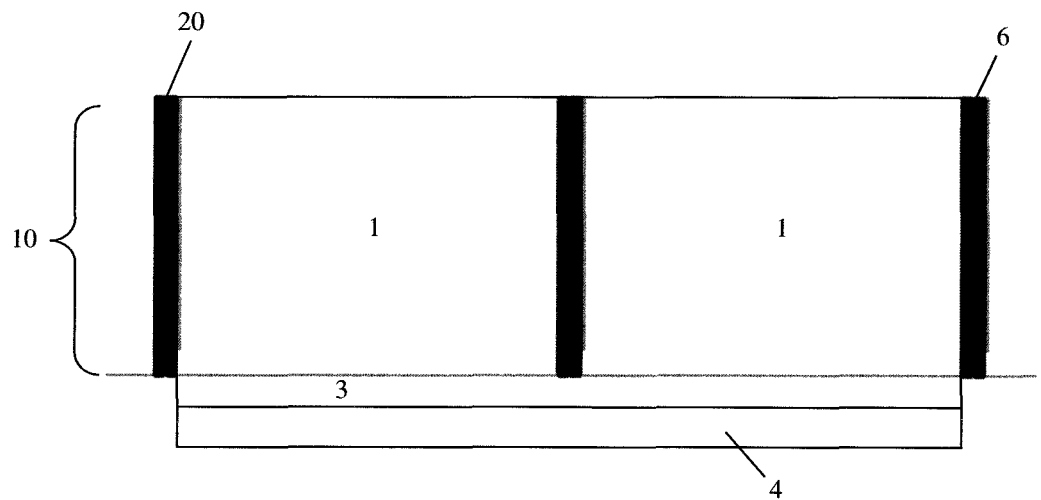

In the electrowetting display unit of the first embodiment, since the spaces 6 are formed on the separation walls 20 of the fluid chamber 10, the non-polar fluid 2 moved into the corner will not be attached to the corner or the middle portion of the bottom surface of the fluid chamber, but be pressed into the spaces 6 by the pressure from the polar fluid 1, which is controlled by the applied voltage by the electrode. FIG. 4b is a schematic view illustrating a non-polar fluid pressed into spaces. In FIG. 4b, the non-polar fluid 2 is not attached to the corner of the fluid chamber, but completely enters the spaces 6 of the separation walls 20. At this time, users can only see the thickness of the non-polar fluid within the spaces in the separation walls, so the visible region of the non-polar fluid of the pixel unit is greatly reduced, and the transmittance and contrast of the electrowetting display can be increased, compared with the conventional technology.

When the display unit returns to the dark state, the previous applied voltage is removed, and thus the medium layer 3 is changed into a hydrophobic layer again, the pressure of the polar fluid 1 onto the non-polar fluid 2 does not exist any more, and then the non-polar and polar fluids 2 and 1 return to their original states. The non-polar fluid 2 come out of the spaces due to the gravity and the shrinking and retreat of the polar fluid 1.

Figure 5A:
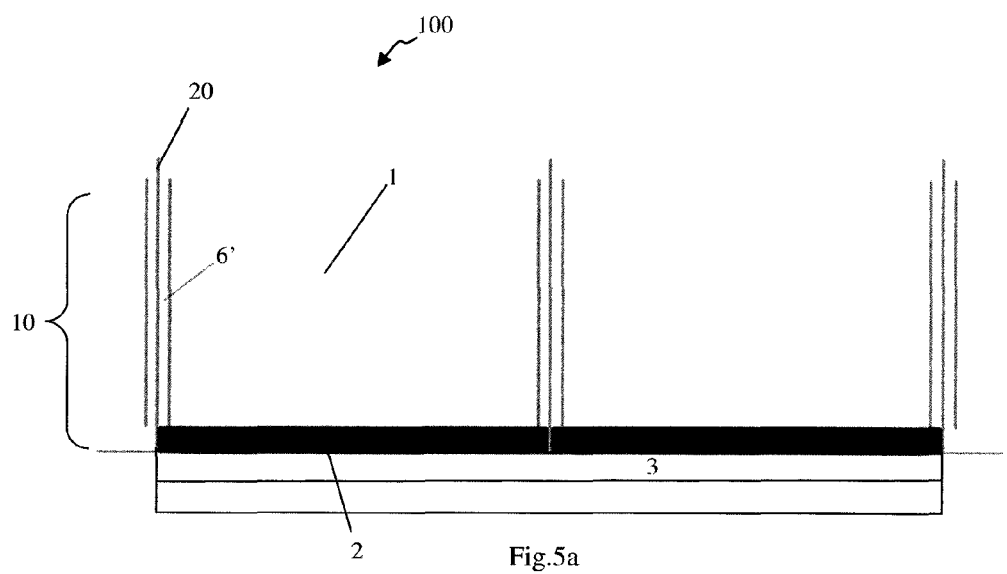
FIGS. 5a and 5b are cross-sectional views schematically illustrating an electrowetting display unit in which spaces are disposed on separation walls, in a dark state and a bright state, respectively, according to a second embodiment of the disclosed technology.
Figure 5B:
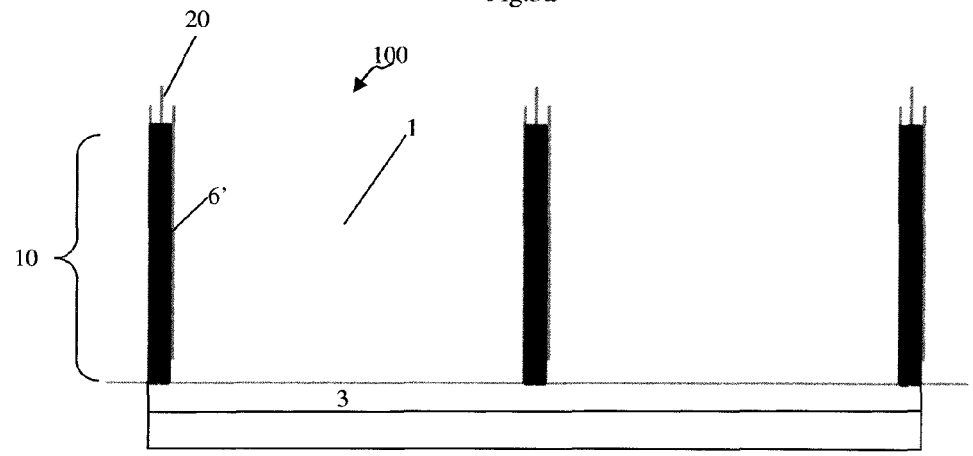

FIGS. 5a and 5b are schematic structure views of an electrowetting display unit according to a second embodiment of disclosed technology. In the electrowetting display unit 100 of the first embodiment in FIGS. 4a and 4b, the spaces 6 provided on the separation walls are only opened toward the medium layer 3, and the upper portions of the spaces 6 are closed. Unlike the electrowetting display unit of the first embodiment, spaces 6' provided on the separation walls 20 of the fluid chamber 10 are opened not only at the bottom of the spaces (i.e., toward the medium layer) but also at the top of the spaces.

In the second embodiment, when the display unit 100 works in a dark state, as shown in FIG. 5a, the same fluids are contained in both of the inside and outside of spaces in the separation walls 20 of the fluid chamber 10. When a voltage is applied to the display unit to perform a bright state displaying, as shown in FIG. 5b, the polar fluid 1 outside of the spaces presses the non-polar fluid 2 into the spaces, and the polar fluid 1 at upper portion of the spaces 6' outflows from the spaces to complement the polar fluid 1 outside of the spaces 6' and in the fluid chamber 10. Because the non-polar fluid 2 entering into the spaces 6' presses the polar fluid 1 inside of the spaces 6', all of the non-polar fluid 2 can enter the spaces 6'. When the voltage is removed, the pressure of the polar fluid 1 upon the non-polar fluid 2 vanishes, and then the non-polar fluid 2 outflows from the spaces 6' due to the gravity and the removal of the pressure. In this case, the outflow of the non-polar fluid from the spaces is performed along with removing the applied voltage.

Alternatively, in the case of upper portions of spaces 6' being opened, the non-polar fluid 2 outflows from the spaces 6' by continuously applying the voltage. That is, when non-polar fluid 2 is filled up the spaces 6', the voltage is applied to the electrode continuously, and thus the non-polar fluid 2 is continuously pressed by the polar fluid 1 so as to be discharged from the top openings of the spaces 6' to the outside of the spaces 6'. At this time, if the voltage is removed, the non-polar fluid and the polar fluid return to the original states in which the non-polar fluid 2 is in a flat state above the medium layer 3, that is, blankets the medium layer 3.

Since there is small amount of the non-polar fluid within the electrowetting display unit 100 (display pixel), narrow spaces or shallow spaces can contain the non-polar fluid within one pixel. In addition, spaces may be formed on all of separation walls around the fluid chamber, so that the gap of each space can be further reduced. In this way, the non-polar fluid within one pixel may be uniformly distributed into the spaces in the separation walls around the fluid chamber, so the visibility of the non-polar fluid is reduced, and the object of the disclosed technology is achieved.

On the other hand, the spaces cannot be too narrow. If the spaces are too narrow, capillary force in the spaces of the separation walls will be increased. Since the capillary force acts in one-way, strong capillary force is harmful to the electrowetting display, and the non-polar fluid may be prevented from entering or being discharged smoothly from the spaces. If the spaces are designed too narrow, the requirements for the process for manufacturing the spaces will become high also, so the costs of the process may be significantly increased.

The separation walls of the fluid chamber are generally made of an insulation material, such as an organic material such as polymer material, an inorganic ceramic, or a composite material.

The spaces may be formed by any proper methods based on the material of the separation walls. When the separation walls are made of inorganic material or other rigid material, the spaces can be fabricated with a mechanical method. If the material of the separation walls is photoresist, the spaces may be formed by a photolithography process, such as exposure and development processes, which are well known. In addition, the height and width of the spaces may be adjusted depending on the amount and viscosity of the non-polar fluid, the size of the display pixel, or the like.

As needed, internal walls of the spaces may be treated to be wettable with respect to the non-polar fluid. In this way, when the non-polar fluid enters the spaces, it may easily contact the internal walls of the spaces and be held within the spaces. The material of the inner surfaces of the spaces may be selected to generate a large adhesion force between the spaces and the non-polar fluid. In addition, the internal walls of the spaces may be treated, or be coated with a substance with an affinity with respect to the non-polar fluid. In general, a non-polar material may be more easily wettable for non-polar material than polar material. Thus, the substance with an affinity for non-polar fluid includes for example resin. However, the wettability of the internal surfaces (walls) of the spaces with respect to the non-polar fluid also may bring some problems. The electrowetting display is a bidirectional display, which requires a rapid transformation between the bright state and the dark state during displaying image. If the internal walls of the spaces is wettable to the non-polar fluid, when the electrowetting display unit return to the dark state from the bright state, the return speed of the electrowetting display unit may become slow or the electrowetting display unit cannot smoothly return to the dark state due to the wettability of the internal walls of the spaces with respect to the non-polar fluid. Thus, the wettability of the internal walls of the spaces can be selected depending on the actual displaying situation.

In addition, the electrowetting display unit of the disclosed technology may also display images in various grey scales. Particularly, the gray-scale display may be realized by controlling the pressure of the non-polar fluid to the polar fluid via the voltages applied by the electrodes and thus controlling the amount of the non-polar fluid entering into the spaces in the separation walls.

Moreover, as needed, the separation walls of the fluid chamber may be made of a transparent material or an opaque material. If the separation walls are made of a transparent material, a user only can see the thickness of the non-polar fluid within the spaces which is very small in a full-white mode. If the separation walls are made of an opaque material, the user will not see the non-polar fluid. The color of the separation walls of the fluid chamber may be selected in practice, and is typically black or white. If the display unit is formed with black separation walls and in the full-white mode, the user can see the black thickness of the spaces that is also very small, similar to the case of using transparent separation walls. Preferably, the separation walls are formed in the white color. In this way, when in the full-white mode, the whole pixel is in the white color; when in the full-black mode, since the spaces are thin, the influence of the white spaces is also very small.

As above described, some exemplary embodiments of the electrowetting display units are described. In these embodiments, spaces are formed in the separation walls of the fluid chamber of an electrowetting display unit. When the display state of the electrowetting display unit is changed by applying a voltage, the non-polar fluid in the electrowetting display unit is pressed by the polar fluid, which is controlled by the voltage applied from an electrode, and enters the spaces in the separation walls around the fluid chamber, rather than collected at the corner of the bottom of the fluid chamber to block light. Thus, the user can only see the thickness of the non-polar fluid within the spaces of the separation walls around the fluid chamber, so that the area in which the non-polar fluid can be seen is greatly reduced, and the transmittance and contrast of the electrowetting display can be increased. Especially, in the case of the black-white mode display of the electrowetting display, when in full-white display mode, in the conventional electrowetting display the non-polar fluid shrinks but still remains in the display pixel, so display quality in the full-white display mode is poor; however, for reducing the visibility of the black non-polar fluid in the black-white mode display, in at least one embodiment of the disclosed technology, the spaces are provided on the separation walls in the disclosed technology, so that the full-white mode display can be implemented well, and the display contrast can be improved.

Figure 2A:
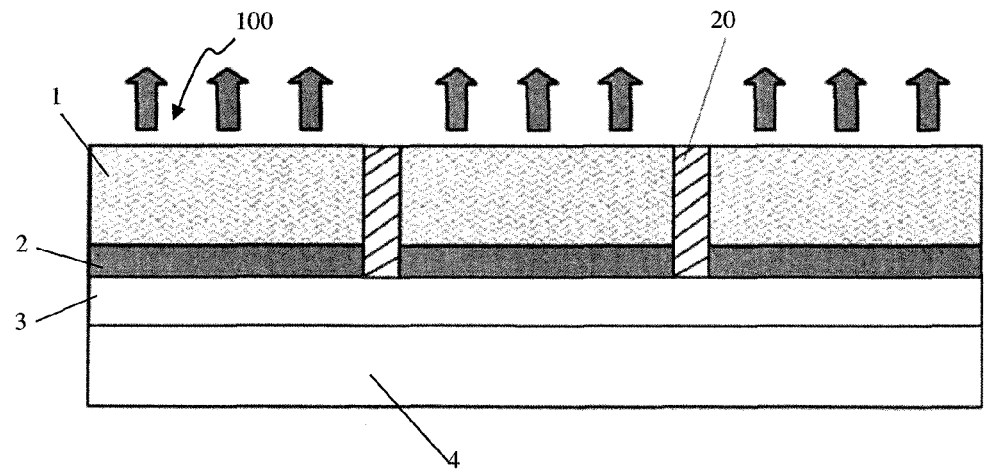
FIGS. 2a and 2b are cross-sectional views illustrating a part of an electrowetting display device comprising three electrowetting display units in a dark state and a bright state, respectively.
Figure 2B:
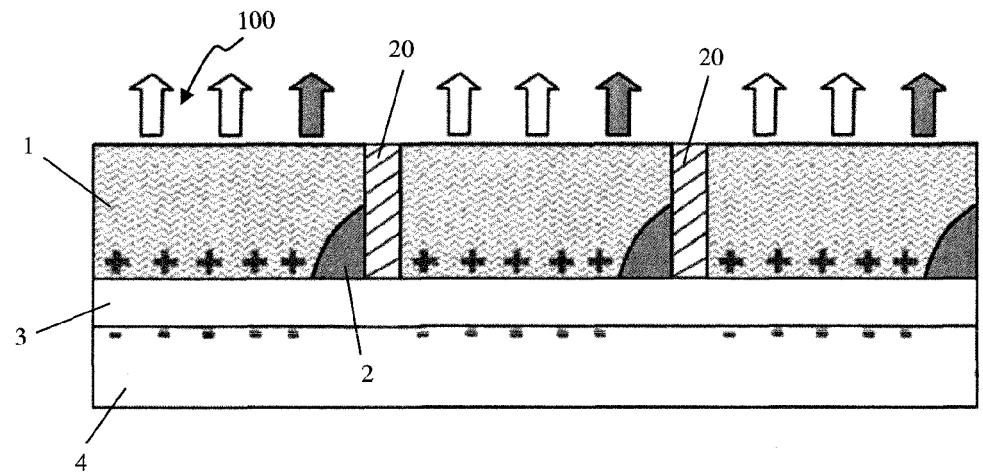
Figure 3A:
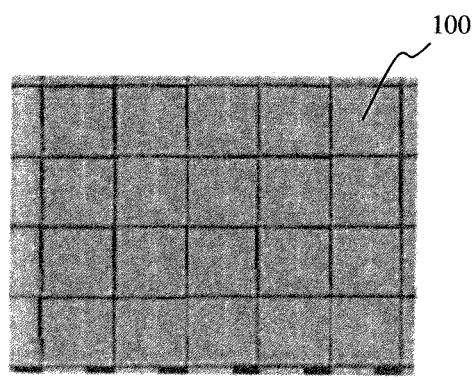
FIGS. 3a and 3b are top views illustrating the electrowetting display device comprising the electrowetting display units of FIG. 1a in a dark state and a bright state, respectively.
Figure 3B:
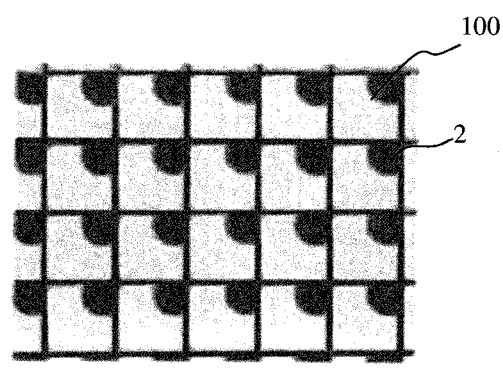

In addition, the disclosed technology further provides an electrowetting display device comprising the electrowetting display units according to one of the above embodiments of the disclosed technology. FIGS. 6a and 6b are top views illustrating an electrowetting display device according to the disclosed technology in a dark state and a bright state, respectively. As shown in FIGS. 6a and 6b, in the bright state, the non-polar fluid, which will accumulate at the corner of the fluid chamber as shown in FIG. 2b, now completely enters the spaces in the separation walls around the fluid chamber of each pixel unit 100, so the visibility of the non-polar fluid is greatly reduced, and the transmittance and contrast of the electrowetting display are increased.

In the embodiments, the polar fluid and the non-polar fluid are liquid, and can be any suitable material or combination for realizing electrowetting display, which are well-known in the relevant technical field, and the detailed description is omitted here for simplicity.

It is apparent to those skilled in the art that change and modification can be made in the disclosed technology without depart from the scope of the disclosed technology. Those skilled in the art should understand that the above described embodiments are only for the purpose of illustrating the disclosed technology but not for limiting to the disclosed technology. The disclosed technology is not limited to these embodiments, but is defined by accompanying claims.

What is claimed is:

1. An electrowetting display unit, comprising:
   a fluid chamber comprising a polar fluid, a non-polar fluid that is colored, and separation walls for confining the polar fluid and the non-polar fluid;
   a medium layer located below the fluid chamber and in contact with the non-polar fluid or polar fluid in the fluid chamber; and
   an electrode located below the medium layer,
   wherein spaces are provided on the separation walls, have openings toward the medium layer, and function to completely or partially store the non-polar fluid when a voltage is applied between the polar fluid and the electrode.

2. The electrowetting display unit of claim 1, wherein the spaces are provided on all the separation walls around the fluid chamber.

3. The electrowetting display unit of claim 1, wherein the separation walls are made of a transparent material or an opaque material.

4. The electrowetting display unit of claim 2, wherein the separation walls are made of a transparent material or an opaque material.

5. The electrowetting display unit of claim 1, wherein a top of the spaces is opened to form openings.

6. The electrowetting display unit of claim 2, wherein a top of the spaces is opened to form openings.

7. The electrowetting display unit of claim 1, wherein internal surfaces of the spaces has wettability with respect to the non-polar fluid.

8. The electrowetting display unit of claim 2, wherein internal surfaces of the spaces has wettability with respect to the non-polar fluid.

9. The electrowetting display unit of claim 1, wherein the separation walls of the fluid chamber is made of an insulation material.

10. The electrowetting display unit of claim 2, wherein the separation walls of the fluid chamber is made of an insulation material.

11. An electrowetting display device, comprising the electrowetting display unit according to claim 1.

* * * * *